Sept. 22, 1925.

J. J. KEARNEY 1,554,509

DUMP BODY FOR TRUCKS

Filed July 28, 1924

Inventor
Jerome J. Kearney.

By T. J. O'Brien

Attorney

Patented Sept. 22, 1925.

1,554,509

UNITED STATES PATENT OFFICE.

JEROME J. KEARNEY, OF DENVER, COLORADO, ASSIGNOR TO MYSELF AND GEORGE E. WAIT, OF DENVER, COLORADO, DOING BUSINESS AS WAIT-KEARNEY IRON WORKS COMPANY.

DUMP BODY FOR TRUCKS.

Application filed July 28, 1924. Serial No. 728,627.

*To all whom it may concern:*

Be it known that I, JEROME J. KEARNEY, a citizen of the United States, residing at Denver, the city and county of Denver, and State of Colorado, have invented certain new and useful Improvements in Dump Bodies for Trucks; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to dump bodies for automobile trucks.

The automobile truck is employed almost exclusively for heavy hauling, as it is admirably adapted for this purpose. In the handling of sand, gravel, dirt and coal, as well as other materials that do not require careful handling, much time and labor can be saved by dumping the load instead of unloading it by hand.

Many different types of dump bodies have been invented and used in connection with trucks and I do not claim to be the inventor of this idea in its broadest aspect. I have, however, invented a dump body that differs in several important particulars from any with which I am familiar, and which possesses several advantages both as to construction and operation.

Figure 1:
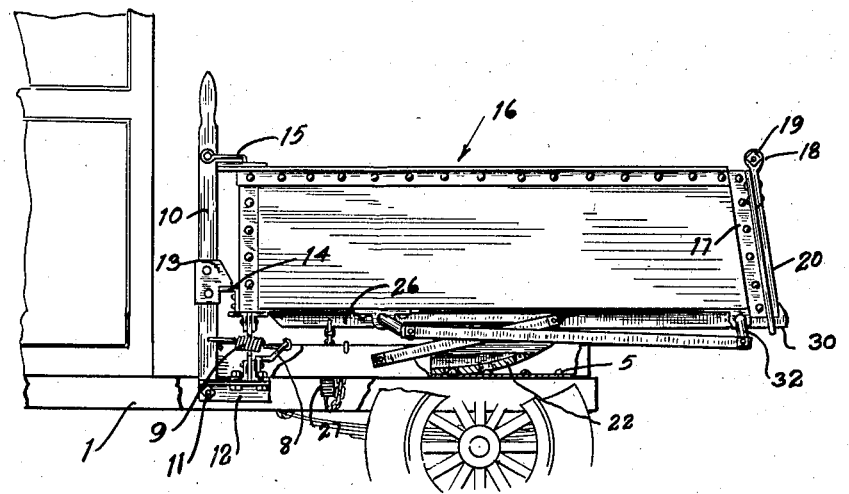
Figure 2:
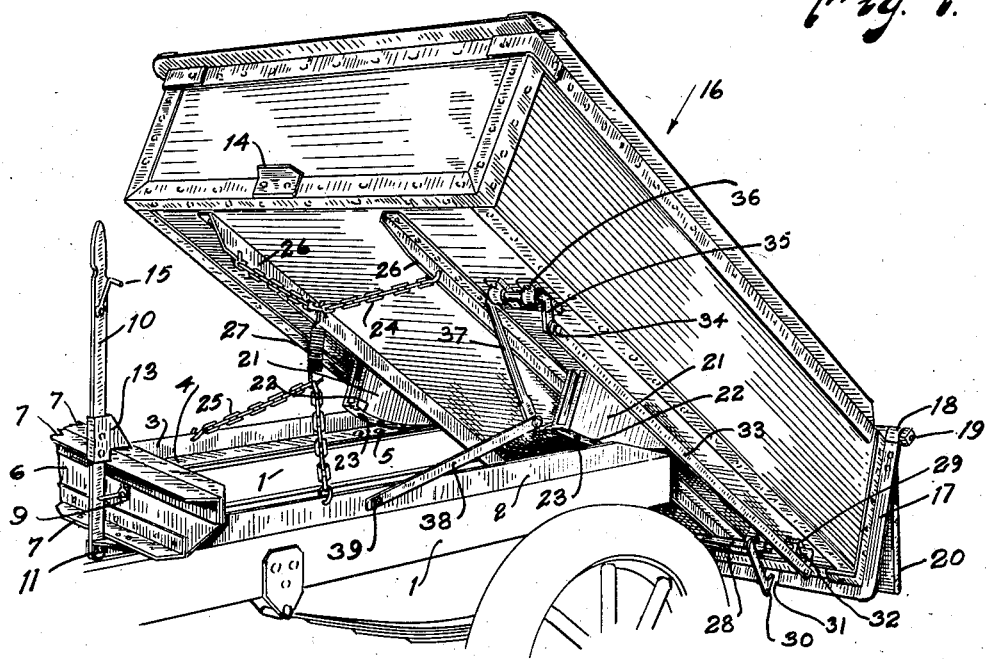

My invention can be most clearly described and will be most readily understood when reference is had to the accompanying drawing in which the preferred form thereof is illustrated, and in which:

Fig. 1 is a side elevation of a portion of an automobile truck chassis showing my improved body in place thereon and in operative position; and Fig. 2 is a view similar to that shown in Fig. 1 and shows the body in dumping position.

Numeral 1 designates the channel iron side members of an automobile truck, to which my improved dump body is secured. My improved dump body consists of two spaced angle irons 2 and 3, which are secured to the upper flanges of the channels 1 by means of bolts or rivets 4 and 5. The rivets 5 have large conical heads and are spaced equidistantly apart in the manner shown in Fig. 1 and serve a purpose which will be hereinafter described. Although there are several rivets—five on each side—it is not necessary that more than one on each side shall pass through the flange of the channels 1. The forward ends of angles 2 are connected by means of a built up I-beam having a central web 6 and angle iron flanges 7. A bracket 8 (Fig. 1) is connected to the I-beam and serves as a mean for anchoring the rear end of the spring 9, which passes through an opening in the web 6 and is connected to the lever 10. This lever is pivoted at 11 between two angle irons 12 and carries a projecting lug 13, which projects rearwardly and has its rear edge upwardly and forwardly inclined so that it will be moved when struck by the nose plate 14 on the front end of the body, which it is adapted to engage in the manner shown in Fig. 1 for the purpose of locking the body in operative position. A hook 15 is pivotally connected to the upper end of the lever and is adapted to engage over the upper edge of the front end of the box for the purpose of preventing accidental releasing of the lock. The box 16 is preferably made of steel plates with angle iron reinforcements. The rear end of the box is cut at an angle and reinforced with angles 17 whose upper ends have secured thereto eyelets 18, which receive the ends of the rod 19, to which the end gate 20 is hinged. It is evident that on account of the fact that the rear ends of the sides of the box are inclined forwardly in an upward direction, the end gate, which is pivoted on rod 19, will close before the box attains a horizontal position. This is taken advantage of in providing an automatic locking device, which will presently be described.

For the purpose of pivotally attaching the box to the truck, I secure to the bottom of the box two pivots 21. These pivots have their underside curved, as indicated by numeral 22. The curved sides 22 are provided with spaced openings 23, which are adapted to register with the heads of the rivets 5.

When the box is tilted, it rocks on the curved sides 22 with the result that the pivot point moves as the box is tilted. When the box is in the position shown in Fig. 1, the forward end of the curved side 23 rests upon the angle 2 in the manner shown in Fig. 1, but when the box is tilted (Fig. 2) the rear part of the curved side 22 rests upon the angle. It will be seen that the rocking connection between the box and the supporting angles causes the pivot point or fulcrum to travel rearwardly when the box is dumped and forwardly when it is moved to horizontal position. By properly positioning the pivot members 21, it is possible to secure a relation of parts in which the box, when it is in the operative position (Fig. 1), will be such that a vertical line passing through the center of gravity of the box will be to the rear of the point where the sides 22 contact with the flanges of the angles 1, but when the box is tilted for dumping (Fig. 2), the vertical line referred to passes to the front of the pivot point. It is therefore evident that when the box is in the position shown in Fig. 1, it has a tendency to rotate and move to the position shown in Fig. 2 and when it is in fully tilted position (Fig. 2), it has a tendency to move back to the position shown in Fig. 1. If left alone the box would naturally come to rest at a point intermediate the position shown in Fig. 1 and the dumping position. The box is held in operative position (Fig. 1) by means of the lever 10 and associated parts, which have been described above. In order to limit the tilting of the box, I provide two chains 24 and 25. The ends of the former are connected to the angle irons 26 that are secured to the bottom of the box, while chain 25 is connected to the angle irons 2, all in the manner shown in Fig. 2. A spring 27 connects the two chains. Let us now suppose that the box is in the position shown in Fig. 1 and that the driver releases hook 15 and pulls lever 10 forwardly until the locking member 13 moves out of contact with the nose plate 14. The box will then start tilting and the momentum will carry it so far that the spring 27 will be tensioned. The spring 27 will bring the box to a gradual stop and give it an impulse in the other direction, which, when added to the natural tendency to rotate back to a neutral position, will return it to the position shown in Fig. 1 where it will automatically lock. If the end gate were merely hung loosely on the bar 19, it would open and close while the box moved from operative to dumping position and back again. It is, of course, necessary that the end gate should be locked, except when the load is to be dumped. I have provided means for automatically unlocking the end gate when the box moves to dumping position and for locking the same as the box moves back to operative position. This means consists of a rod 28 that is pivoted at 29 to the bottom of the box and extends parallel with the lower end of the end gate 20. This rod has hooks 30 rigidly secured thereto. These hooks are adapted to extend through the notches 31 and to engage the lower end of the end gate in the manner shown in Fig. 1. One end of rod 28 is bent so as to provide a crank arm 32, to the end of which one end of bar 33 is pivotally connected. The other end of the bar 33 is pivoted at 34 to the end of the crank 35, which is rotatably mounted in the bearings 36. The other end of the rod from which the crank arm 35 is bent is also bent into a crank 37, which is longer than the crank 35 and has its end pivoted to a link 38 whose other end is pivoted at 39 to the side of the channel 2. The parts just described are so proportioned and related that the hooks 30 will be moved to unlocking position as the box tilts from the position shown in Fig. 1 to that shown in Fig. 2 and to the locking position as it moves back to operative position.

When the box is full of sand, gravel or coal, or any other material that is dumped, the load will cause it to tilt farther and tension the spring 27 more than if the box is tilted when empty. This produces a strong force tending to return the box to operative position and as a result, it returns to this position as soon as the load is dumped, which makes the operation automatic. The driver is required merely to unlock the box by pulling the lever 10 forwardly.

It will be evident from the above that I have produced a dump body that is of simple and substantial construction, and which is practically automatic in its operation so that it is unnecessary for the driver to leave his seat in dumping a load.

Having now described my invention, what I claim as new is:

In a dump body for trucks, in combination, a frame comprising a pair of spaced parallel angle irons adapted to be secured to the upper side of the side members of a truck chassis, a box secured to said angle irons by means that permit it to tilt from operative to dumping position, an end gate for closing the rear end of said box, said end gate being connected to the box by means that permit it to swing about an axis substantially on the level with the top of the box, means for holding said end gate in closed position, said means comprising a bar extending transversely of the box and pivotally attached to the lower side of the box near the rear end thereof, a pair of hooks rigidly attached to said bar, said hooks being adapted to engage the lower end of the end gate, said bar having one end bent at right angles to provide a crank arm, a crank shaft pivotally attached to the bottom of the box at a point spaced from the bar, said crank shaft having two crank arms of unequal length, a connecting rod joining the end of the crank arm on the bar with the shorter crank arm on the crank shaft and another connecting rod joining the end of the long crank arm with a point on the frame, said means being adapted to release the end gate when the box is dumped.

In testimony whereof I affix my signature.

JEROME J. KEARNEY.